Patented Feb. 24, 1953

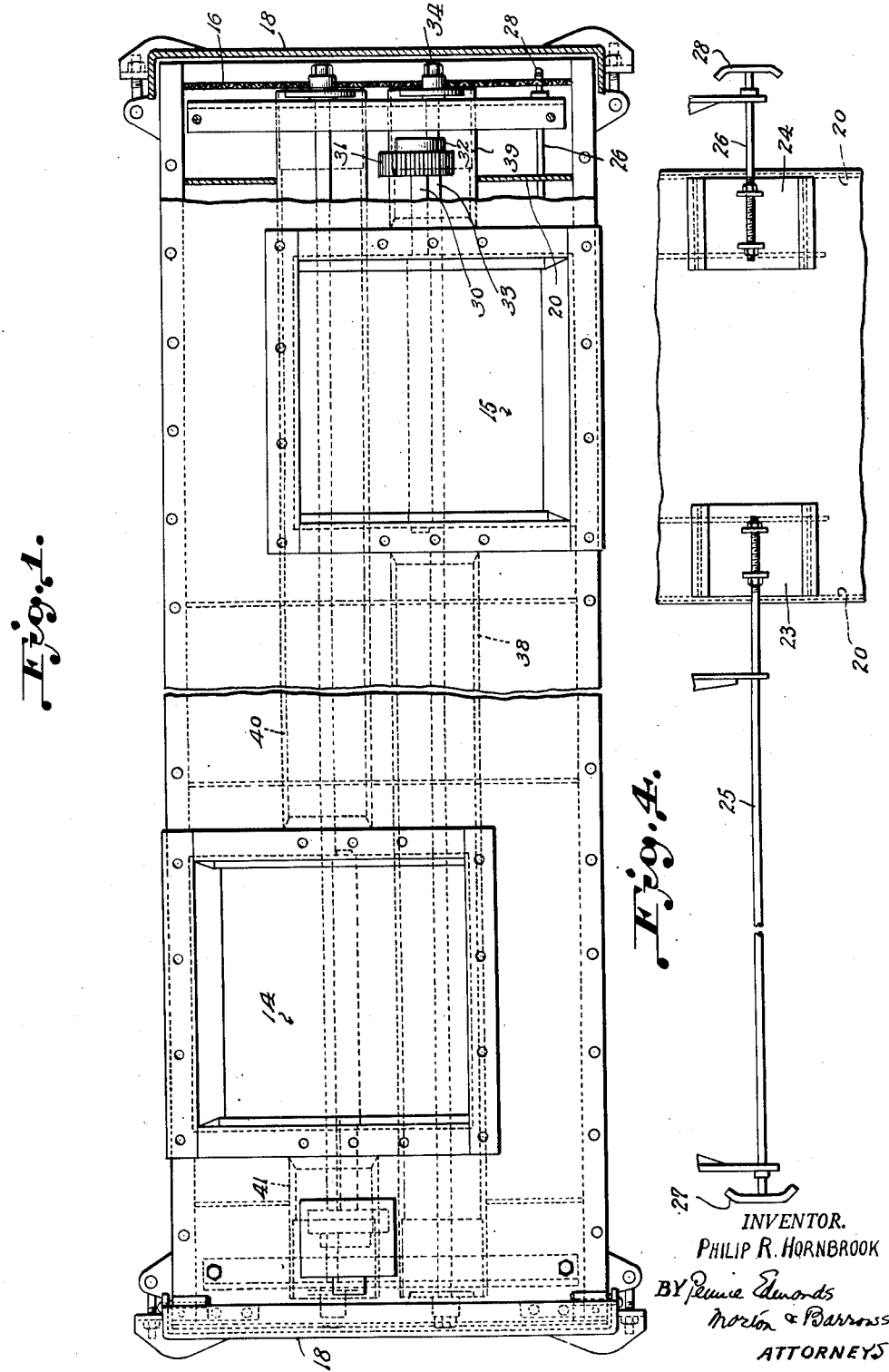

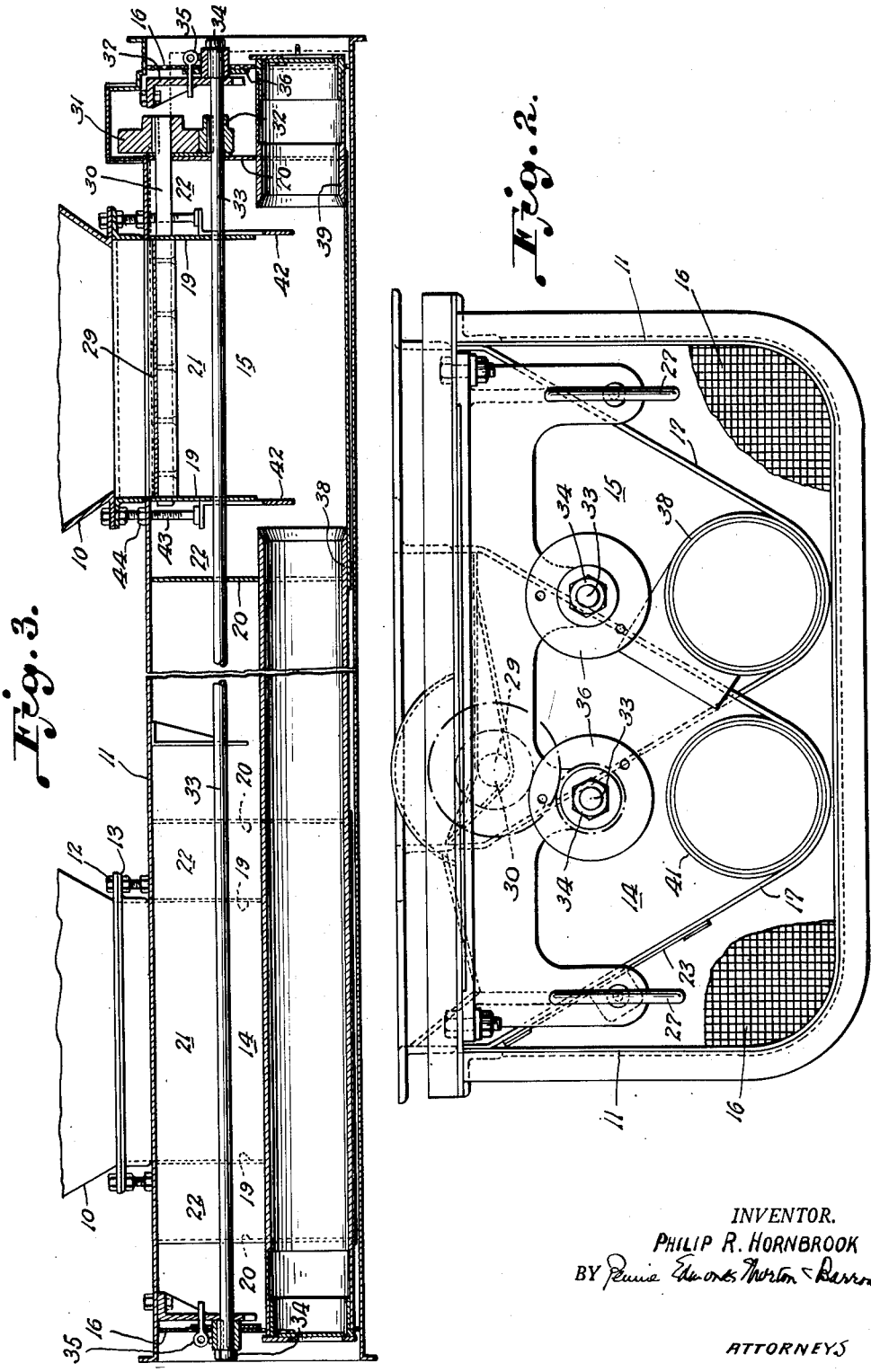

2,629,637

UNITED STATES PATENT OFFICE 2,629,637

PNEUMATIC UNLOADER

Philip R. Hornbrook, Allentown, Pa., assignor to Fuller Company, Catasauqua, Pa., a corporation of Delaware Application December 13, 1949, Serial No. 132,670

11 Claims. (Cl. 302—52)

This invention relates to apparatus for unloading hopper bottom vessels and similar receptacles, and more particularly, is concerned with a novel unloader for hopper bottom vehicles. The new unloader is primarily intended for use in unloading flour, but may be used on any pulverulent or granular material, made up of particles from micronic size up to several inches in diameter, and capable of being entrained in an air stream and delivered through a conduit to a desired point.

This apparatus of the invention is intended for use in conjunction with pneumatic conveying systems of the type that are widely used for transporting pulverulent or crushed materials entrained in an air stream. Such pneumatic systems usually have a receiver, maintained under reduced pressure by suitable means, connected to one end of a conduit. The other end of the conduit is connected to an unloader adapted to be inserted into material to be conveyed. The unloader includes a nozzle, with air admitted into the unloader adjacent the nozzle, entraining the material, and causing a flow of air and material through the conduit into the receiver as a result of the reduced pressure within the receiver.

Unloaders of the kind heretofore used in the conveying systems described have been found to have certain disadvantages when the systems are used for unloading receptacles of the hopper bottom type, especially hopper bottom vehicles, in which the unloader nozzle lies below the well of the hopper. For example, when certain materials within the receptacle are transported or stored for a considerable time, they lose their free flowing characteristics, so that, as the material adjacent the nozzle is removed during the operation a cavity is left around the nozzle, with the result that the entraining air traveling into the nozzle fails to loosen the material and to transport it through the system. Similarly, when the receptacle is nearly empty, it has not been possible to effect complete removal of the material, and a substantial amount of the material is left behind. Certain materials, such as flour, are subject to deterioration, and if left in the receptacle, even in small quantities, may completely contaminate the next shipment; therefore, the failure of the apparatus to empty the receptacle completely, requires that expensive cleaning operations be performed prior to each shipment.

Certain unloaders have been developed which are not subject to some of the objections stated, but these unloaders operate at poor efficiency with much labor and time required to shift from an empty vessel to a full vessel. Also, none of these unloaders are of such design that will permit forming two of them into a single operating unit, adapted to become a permanent part of the transporting vehicle.

The present invention is, accordingly, directed to a novel unloader for use with pneumatic conveying apparatus, which overcomes the objections to prior unloaders in that it permits the vessel, to which it is attached, to be completely emptied; also, it may be so constructed that it can be attached to a plurality of vessels which can then be emptied in succession with little labor involved in the change-over. The new unloader requires no manual labor during its operation, and it operates at a rapid rate to discharge from either side of the vessel. It can be equipped to provide filtered air for conveying, and may thus be used in unloading materials which are subject to contamination.

The new unloader, in a form suitable for emptying a plurality of vessels such as the compartments of a hopper-bottom railroad car, includes a casing having two receptacles, each connected to one of the hopper bottoms. Each receptacle has a discharge tube leading from the lower end of each of its outer walls, either of which may be connected to a transport line maintained under reduced pressure. The tubes are opened to the interior of the respective vessels and air is admitted into each tube to effect movement of the material from the receptacle, through the discharge tube and into the transport line. To insure that material adjacent the intake of the discharge tube will be properly picked up and entrained the air entering the tube is caused to impinge against the surface of the material at the intake of the tube, which material has a slope determined by the angle of repose thereof. The air admitted in the opposite side of the receptacle, from which the discharge tube which is being used leads, then serves to propel the material toward the discharge tube intake where it is picked up and entrained by the impinging air.

In the preferred construction of the unloader the design is adapted for use on a railroad hopper-bottom car, and is provided with means to permit the railroad car to be unloaded from either side. The design of railroad cars with which the unloader is used is such that the outlet from two hopper-bottom vessels are located adjacent each other on parallel center lines athwart the longitudinal center line of the car. This arrangement forms a pair of vessels that function as a single unit. The number of these vessels, or units, that can be located along the longitudinal center line of the car will be determined by the length, or capacity, of the railroad car.

The unloader consists of a casing having two necks, or extensions, at its upper end, adapted to be connected to the hopper outlets of a pair of vessels functioning as a unit. There is a receptacle within the casing beneath each neck which receives the material discharged from the vessel through the neck. Each receptacle has two end walls and two downwardly convergent side walls. A discharge tube is connected into an opening in the lower end of each end wall. The discharge tubes extend in opposite directions from the respective end walls to the outside of the casing, for connection to a plant transport line. Inside the end walls of each receptacle are two vertical interior walls spaced from each end wall to form an air passage between each end wall and the adjacent interior wall, thereby providing an air passage at each end of each receptacle. There is an adjustable extension plate at the bottom of each interior wall for the purpose of changing the distance between the lower edge of the interior wall and bottom of the receptacle, in the event that materials having different angles of repose are placed in the receptacle. Two openings are provided in one of the side walls of each receptacle to admit air from the interior of the casing into the respective air passages between end walls and the inner walls thereof. Each opening is controlled by a gate valve actuated by a control rod extended to, and operable from, the outside of the end of the casing. A material control valve is located in the neck or extension of each receptacle to control the flow of material passing through the space defined by the two inner walls. This valve, also, is actuated by a mechanism extending to and operable from, the outside of the end of the casing. Each end of the casing is provided with a filtering screen, through which all of the air passing into the casing and from it into the receptacles for the operation of the unloader is admitted.

For a better understanding of the invention, reference may be made to the accompanying drawings, in which:

Fig. 1 is a top plan view of the unloader of the invention;

Fig. 2 is an end view of the unloader of Fig. 1 with parts removed and others broken away;

Fig. 3 is a sectional view in side elevation of Fig. 1;

Fig. 4 is a side elevation view showing the air intake valves of one of the receptacles.

The device illustrated includes a casing 11 attached to two vessels 10 by means of companion flanges 12 and 13 on the lower ends of the vessels and the upper ends of the necks or extensions of receptacles 14 and 15, respectively. These companion flanges may be attached in any conventional manner, such as by welding, bolts, etc. The casing 11 forms an air duct for the purpose of housing the two receptacles 14 and 15, and supplying operational air to the two receptacles located inside the casing. Located, and securely attached, at each end of the casing 11 is an air filter screen 16, which filters the operational air entering the casing for subsequent contact with the materials to be unloaded. The filtering of the air is of utmost importance when materials subject to contamination, such as flour, are being unloaded from the vehicle. The air duct inside casing 11 is formed by the walls of casing 11 and the side walls 17 of the receptacles.

It will be seen from Fig. 2 that the space formed by the inside walls of casing 11 and the outside of the receptacle walls 17 will be ample to enable a large quantity of operational air to enter the inside of casing 11 through screen 16 and pass into each receptacle. A door 18, fitted with a rubber gasket is located at each end of casing 11, as shown in Fig. 1, for the purpose of sealing, while in transit, the internal elements from mechanical injury. This sealing also prevents foreign matter and weather from entering the casing and possibly contaminating the material being transported.

Each casing contains two identical receptacles, one for each vessel, but for the purpose of simplicity I will describe only one receptacle; each of the receptacles has identical elements, and the operation of each receptacle is the same.

The receptacle 15 is formed by two outer end walls 20 each attached to the top of the casing 11 and extending downwardly and at right angles therefrom; and by two side walls 17 attached to the top of the casing 11 and extending downwardly and inwardly therefrom. All four sides of the receptacle terminate above the bottom of the casing. A material passage 21 is formed within the receptacle 15 by the side walls 17 of the receptacle and the two inner walls 19 attached to the top of the casing 11, and spaced inwardly from the two end walls 20. These inner walls 19 extend downwardly from the top of casing 11 and terminate above the bottom of the receptacle.

Air passages 22, for the flow of air from the inside of the casing 11 into the inside of the receptacle, are formed by the spaced arrangement of the end walls 20 and the inner walls 19. Figs. 2 and 4 show a preferred method for the admission of air from the inside of casing 11 into air passages 22. Two openings in the outer wall 17 are covered by sliding gate valves 23 and 24 held in a sliding contact position with the side wall of the receptacle by two flanges securely attached to the receptacle. Air valve 23 is actuated by a control rod 25, and air valve 24 is actuated by a control rod 26, with each control rod extending to the outside of screens 16 and provided with operating handles 27 and 28.

Inner wall 19 is provided with an adjustable depth wall 42. This adjustment is for the purpose of changing the distance from the lower edge of the inner wall 19 to the bottom of the receptacle 15, in the event that materials having different flow characteristics, and therefore different angles of repose, are being unloaded. This adjustment is brought about by the rotation of nut 44 on a threaded shaft 43 attached to the depth wall 42.

For the purpose of controlling the flow of material from the vessel 10 into the receptacle 15 a rotating gate valve 29 is provided. Gate valve 29 is mounted on shaft 30, and is positioned in the material passage 21. Secured to the end of shaft 30 is a spur gear 31 engaging a pinion gear 32, mounted on shaft 33. Shaft 33 extends the complete length of the casing and to the outside of each of the screens 16, and is provided with a turning nut 34 for the purpose of rotating the shaft 30; thereby resulting in the rotation of gate valve 29. Shaft 33 normally is prevented from rotating by an engaging pin 35. This pin 35 is inserted in the mating holes in disc 36, mounted on shaft 33, and flange 37, mounted on casing 11.

Discharge tubes 38 and 39 have their inner end portions secured within openings in the respective end walls 20 of receptacle 15, for the purpose of discharging materials from the receptacle. Receptacle 14 is provided with similar discharge tubes 40 and 41 for the same purpose. All of the discharges tubes extend through the screens 16 at their respective ends of the casing for attachment to a plant transport line maintained under reduced pressure.

The operation of the unloader is as follows. After the loaded railroad car or other vehicle having the vessels 10 has arrived at its destination, the door 18, on the side adjacent the plant transport line is opened to give access to, for example, discharge tube 39. The end of the plant transport line is slipped inside the outer end of discharge tube 39; being held in position by the reduced pressure within the system. With the plant transport line in position, there is now communication between the inside of the receptacles and the plant receiver to which the other end of the transport line delivers, and the entire system is now under reduced pressure.

Material gate valve 29 of receptacle 15 is opened to allow material in the overlying vessel 10 to drop to the bottom of the receptacle. To open material gate valve 29, pin 35 is removed from its position in disc 36 and flange 37; thereby enabling shaft 33 to rotate. Turning nut 34 is engaged with a suitable wrench and shaft 33 rotated to open the material gate valve 29 through the connection of the shaft 30 to the shaft 33 through the gears 31 and 32.

As the material falls to the bottom of receptacle 15 the air control valve 24 is opened by pulling handle 28. The opening of this air valve permits air to flow into the casing 11, through the filter screen 16. The air inside the casing will then enter the air passage 22 of the receptacle 15 through the air valve 24, pass across the toe of the pile of material at the entrance of the discharge tube 39, and pass out the discharge tube into the transport line and on to the plant receiver. As the air passes over the toe of the pile, the material is picked up and entrained in the air stream due to the mass velocity of the air, and the changing of direction of the air stream over the toe of the pile. In the event the material does assume the correct angle of repose at the entrance of the discharge tube for satisfactory entrainment in the air stream, the angle of repose may be changed by the adjustment of the height of the lower edge of interior wall 42 above the bottom of the receptacle. This adjustment is brought about by the turning of nut 44 on threaded shaft 43.

To permit air to flow through the pile of material on its way to the discharge tube 39, air valve 23 at the other end of the receptacle is opened, by the pulling of handle 27. The movement of air through the pile of material in the receptacle is beneficial in that it causes an aeration or fluidizing effect on the material. This aeration or fluidization creates a flowing characteristic, causing the pile of material to move toward the discharge side into the flow of entraining air entering through the air control valve 24. The movement of air through the pile of material not only aids in the unloading, but is sufficient to discharge the material from the receptacle; however the efficiency of discharge is greatly increased by the entraining air passing over the toe of the pile. Under certain operating conditions such as a light load, a sufficient amount of air will be permitted to flow through the opposite discharge tube into the receptacle to produce the desired aeration or fluidizing effect.

After the receptacle has been unloaded there will usually be small pockets of material left throughout the receptacle. These pockets must be removed since they may possibly contaminate the next shipment. To remove these, air control valve 24 is closed. All of the air then enters the receptacle through air control valve 23, and the opposite discharge tube 38, picking up the small pockets of material and discharging them through the discharge tube 39 into the transport line. This method of cleaning will leave the vessel in readiness for the next shipment.

The procedure for unloading through the receptacle 14 is the same, with the same sequence of operation for each of the respective elements.

Various changes may be made in the details of construction of the unloading apparatus of the present invention without sacrificing any of the advantages thereof or departing from the scope of the appended claims.

I claim:

1. In an unloader for a pair of hopper bottom vessels, the combination of a casing having extensions at its upper end adapted to be connected to the hopper bottoms of the respective vessels, a receptacle within the casing beneath each extension for receiving material from the vessel through said extension, each receptacle including end walls and downwardly convergent side walls, the lower end of each end wall of each receptacle having an opening therein, a discharge tube positioned in each of the openings and extending from the respective end wall to the outside of the casing for connection to a transport line, means within each receptacle forming an air passage, each air passage having an intake opening from the interior of the casing, and a sliding valve for controlling the intake opening of the passages, whereby when said sliding valve is open air for entraining material in the receptacle may pass therethrough into said air passage and out through one of the discharge tubes.

2. In an unloader for a pair of hopper bottom vessels, the combination of a casing having extensions at its upper end adapted to be connected to the hopper bottoms of the respective vessels, a receptacle within the casing beneath each extension for receiving material from the vessel through said extension, each receptacle including opposed vertical end walls and downwardly convergent side walls, each end wall having an opening at its lower end, a discharge tube connected to each of the openings and extending from the respective end wall to the outside of the casing for connection to a transport line, means within each receptacle including a vertical inner wall spaced from each end wall of the receptacle forming air passages adjacent said end walls, each inner wall extending downwardly from the top of the receptacle and having an adjusting means to regulate the distance from the lower edge of said inner wall to the bottom of the receptacle, each air passage having an intake opening from the interior of the casing, and a sliding valve for controlling the intake opening of the passage, whereby when said sliding valve is open air for entraining material in the receptacle may pass therethrough into said air passage and out through one of the discharge tubes.

3. In an unloader for a pair of hopper bottom vessels, the combination of a casing having extensions at its upper end adapted to be connected to the hopper bottoms of the respective vessels, a receptacle within the casing beneath each extension for receiving material from the vessel through said extension, each receptacle including opposed vertical end walls and downwardly convergent side walls, each end wall having an opening at its lower end, a discharge tube connected to each of the openings and extending from the respective end wall to the outside of the casing for connection to a transport line, means within each receptacle including a vertical inner wall spaced from each end wall of the receptacle forming air passages adjacent said end walls, each inner wall extending from the top of the receptacle downwardly and having an adjusting means to regulate the distance from the lower edge of said inner wall to the bottom of the receptacle, each air passage having an intake opening from the interior of the casing, a sliding valve for controlling the intake opening of the passage, the two interior walls and the side walls of the receptacle forming a material passage in the receptacle beneath the hopper bottom opening, a gate valve positioned in the material passage for the control of the flow of material into the receptacle from the vessel, said gate valve being operable from either end of the casing, whereby when said sliding valve is open air for entraining material in the receptacle may pass therethrough into said air passage and out through one of the discharge tubes.

4. In an unloader for a pair of hopper bottom vessels, the combination of a casing having extensions at its upper end adapted to be connected to the hopper bottoms of the respective vessels, a receptacle within the casing beneath each extension for receiving material from the vessel through said extension, each receptacle including opposed vertical end walls and downwardly convergent side walls, each end wall having an opening at its lower end, a discharge tube connected to each of the openings and extending from the respective end wall to the outside of the casing for connection to a transport line, means within each receptacle including a vertical inner wall spaced from each end wall of the receptacle forming air pasages, each inner wall extending downwardly from the top of the receptacle and having an adjusting means to regulate the distance from the lower edge of said inner wall to the bottom of the receptacle, each air passage having an intake opening from the interior of the casing, a sliding valve for controlling the intake opening of the passage, the two interior walls and the side walls of the receptacle forming a material pasage in the receptacle beneath the hopper bottom opening, a gate valve positioned in the material passage for the control of the flow of material into the receptacle from the vessel, said gate valve being operable from either end of the casing, an air filter extending across each end of the casing and a door for sealing each end of the casing while it is in transit, whereby when said sliding valve is open, air for entraining material in the receptacle may pass therethrough into said air passage and out through one of the discharge tubes.

5. An unloading device for a plurality of hopper bottom vessels comprising a receptacle attached to each vessel, each receptacle having outer walls and inner walls extending vertically from the top of the casing, said inner walls being spaced to form a passage for material from the vessel to the bottom of the receiver, each inner wall being provided with an adjustable extension for regulating its depth into the receptacle, each outer wall having an opening in its lower portion, a discharge tube connected to each outer wall and communicating with the interior of the receptacle through said opening, each discharge tube extending from the outer wall to which it is connected to the outside of the casing for connection to a transport line, air passages formed in each receptacle between the inner walls and the outer walls, and means for admitting air into each air passage to impinge on and to entrain material from the sloping surface of material in the bottom of the receptacle adjacent to the opening in the outer wall for discharge through the discharge tube connected to said outer wall.

6. An unloading device for a plurality of hopper bottom vessels comprising a receptacle attached to each vessel, each receptacle having outer walls and inner walls extending vertically from the top of the casing, said inner walls being spaced to form a passage for material from the vessel to the bottom of the receiver, each inner wall being provided with an adjustable extension for regulating its depth into the receptacle, each outer wall having an opening in its lower portion, a discharge tube connected to each outer wall communicating with the interior of the receptacle through said opening, each discharge tube extending from the outer wall to which it is connected to the outside of the casing for connection to a transport line, air passages formed in each receptacle between the inner walls and the outer walls, means for admitting air into each air passage to impinge on and to entrain material from the sloping surface of material in the bottom of the receptacle adjacent to the opening in the outer wall for discharge through the discharge tube connected to said outer wall, an air filter extending across each end of the casing, and a door connected to the top of each end of the casing to seal said casing while it is in transit.

7. In an unloader for a hopper bottom vessel, the combination of a casing having an opening at its upper end surrounded by means for attaching the casing to the lower end of the vessel, a receptacle within the casing below the opening, the receptacle being defined by end walls and downwardly convergent side walls, each end wall having an opening near its lower end, inner walls within the receptacle extending downwardly from the upper end thereof and lying parallel to and spaced from the end walls of the receptacle, the inner walls cooperating with the receptacle end walls to form vertical air passages, said inner walls terminating short of the bottom of the receptacle, material discharged into the receptacle from the vessel entering each air passage beneath the lower end of each inner wall to form a sloping surface, discharge tubes passing through the openings in the receptacle end walls and terminating within the air passages, the tubes leading out of the casing for connection to a transport line, means for admitting air into the casing outside the receptacle, and means for admitting air from the casing into said air passages in the receptacle above the bottom of the receptacle for entraining material entering the air passages and for discharging it through said discharge tubes.

8. In an unloader for a hopper bottom vessel, the combination of a casing having an opening at its upper end surrounded by means for attaching the casing to the lower end of the vessel, a receptacle within the casing below the opening, the receptacle being defined by end walls and downwardly convergent side walls, each end wall having an opening near its lower end, inner walls within the receptacle extending downwardly from the upper end thereof and lying parallel to and spaced from the end walls of the receptacle, the inner walls cooperating with the receptacle end walls to form vertical air passages, said inner walls terminating short of the bottom of the receptacle, material discharged into the receptacle from the vessel entering each air passage beneath the lower end of each inner wall to form a sloping surface, discharge tubes passing through the openings in the receptacle end walls and terminating within the air passages, the tubes leading out of the casing for connection to a transport line, means for admitting air into the casing outside the receptacle, and valve-controlled air inlets in the receptacle walls for admitting air from the casing into the passages in the receptacle for entraining material entering the air passages and for discharging it through said discharge tubes.

9. In an unloader for a hopper bottom vessel, the combination of a casing having an opening at its upper end surrounded by means for attaching the casing to the lower end of the vessel, a receptacle within the casing below the opening, the receptacle being defined by end walls and downwardly convergent side walls, each end wall having an opening near its lower end, inner walls within the receptacle extending downwardly from the upper end thereof and lying parallel to and spaced from the end walls of the receptacle, the inner walls cooperating with the receptacle end walls to form vertical air passages, said inner walls terminating short of the bottom of the receptacle, material discharged into the receptacle from the vessel entering each air passage beneath the lower end of each inner wall to form a sloping surface, discharge tubes passing through the openings in the receptacle end walls and terminating within the air passages, the tubes leading out of the casing for connection to a transport line, means for admitting air into the casing outside the receptacle, members mounted on the inner walls of the receptacle to project beyond the lower ends thereof, said members being adjustable toward and away from the bottom of the receptacle, and means for admitting air from the casing into said air passages in the receptacle above the bottom of the receptable for entraining material entering the air passages and for discharging it through said discharge tubes.

10. An unloader for a pair of hopper bottom vessels, which comprises a casing having a pair of openings in its upper end, each surrounded with means for attaching the casing to the lower end of one of the vessels, a pair of receptacles within the casing below the respective openings, each receptacle being defined by a pair of end walls and downwardly convergent side walls, the lower ends of the receptacles being offset relatively to the longitudinal axis of the casing and each receptacle end wall having an opening at its lower end, a pair of inner walls within each receptacle extending downwardly from the upper end thereof and terminating short of the bottom of the receptacle, the inner walls of each receptacle lying parallel to and spaced from the receptacle end walls and cooperating therewith to form vertical air passages at each end of each receptacle, material discharged into a receptacle from a vessel entering each air passage beneath the lower end of each inner wall to form a sloping surface, a pair of discharge tubes passing through the openings in the end walls of each receptacle and terminating within the air passages in the receptacle, one tube of each receptacle leading through the adjacent end wall of the casing and the other tube of each receptacle passing along the side of the other receptacle and leading through the remote end wall of the casing, means for admitting air into the casing outside the receptacles, and means for admitting air from the casing into the air passages in the receptacles above the bottom of the receptacles for entraining material entering the air passages and for discharging it through said discharge tubes.

11. In an unloader for a hopper bottom vessel, the combination of a casing having an extension at its upper end adapted to be connected to the hopper bottom of the vessel, a receptacle within the casing beneath said extension for receiving material from the vessel through said extension, said receptacle including end walls and downwardly convergent side walls, the lower end of each end wall of said receptacle having an opening therein, a discharge tube positioned in each of said openings and extending from the respective end wall to the outside of the casing for connection to a transport line, means within said receptacle forming an air passage, said air passage having an intake opening from the interior of the casing, and a valve for controlling the intake opening of the passage whereby when said valve is open air for entraining material in the receptacle may pass therethrough into said air passage and out through one of the discharge tubes.

PHILIP R. HORNBROOK.

REFERENCES CITED

The following references are of record in the file of this patent:

UNITED STATES PATENTS

| Number | Name | Date |
|---|---|---|
| 2,378,553 | Hornbrook | June 19, 1945 |
| 2,393,932 | Petroe | Jan. 29, 1946 |
| 2,418,302 | Hornbrook | Apr. 1, 1947 |

FOREIGN PATENTS

| Number | Country | Date |
|---|---|---|
| 688,286 | Germany | Jan. 25, 1940 |